US009881581B2

(12) United States Patent
Vandoros

(10) Patent No.: US 9,881,581 B2
(45) Date of Patent: Jan. 30, 2018

(54) SYSTEM AND METHOD FOR THE DISTRIBUTION OF AUDIO AND PROJECTED VISUAL CONTENT

(71) Applicant: OOHMS NY LLC, New York, NY (US)

(72) Inventor: Alexander Vandoros, New York, NY (US)

(73) Assignee: OOHMS NY LLC, New York, NY (US)

( * ) Notice: Subject to any disclaimer, the term of this patent is extended or adjusted under 35 U.S.C. 154(b) by 77 days.

(21) Appl. No.: 14/250,768

(22) Filed: Apr. 11, 2014

(65) Prior Publication Data

US 2014/0306974 A1 Oct. 16, 2014

Related U.S. Application Data

(60) Provisional application No. 61/812,386, filed on Apr. 16, 2013.

(51) Int. Cl.
*G06T 15/00* (2011.01)
*H04N 21/472* (2011.01)
(Continued)

(52) U.S. Cl.
CPC ............... *G09G 5/00* (2013.01); *G09G 3/002* (2013.01); *G09G 2354/00* (2013.01)

(58) Field of Classification Search
CPC ........................ G06T 15/005; H04N 21/47202
(Continued)

(56) References Cited

U.S. PATENT DOCUMENTS 7,872,643 B2 1/2011 Galligan et al.
8,259,094 B2 9/2012 Galligan et al.
(Continued)

FOREIGN PATENT DOCUMENTS

JP 2006295895 A 10/2006
JP 2008158693 A 7/2008

OTHER PUBLICATIONS

Notification of Transmittal of the International Search Report (Forms PCT/ISA/220 and PCT/ISA/210) and the Written Opinion of the International Searching Authority (Form PCT/ISA/237) dated Aug. 11, 2014, issued in corresponding International Application No. PCT/US2014/033711 . (11 pgs).
(Continued)

*Primary Examiner* — Zhengxi Liu
*Assistant Examiner* — Yi Yang
(74) *Attorney, Agent, or Firm* — Buchanan Ingersoll & Rooney PC

(57) ABSTRACT

A method for the distribution of audio and visual media includes: receiving at least one visual content item to be displayed, and an audio content item and at least one trigger condition for each of the at least one visual content item; storing, in a database, the received at least one visual content item and corresponding audio content item and at least one trigger condition; identifying at least one display condition of a plurality of display conditions; identifying, in the database, a specific visual content item, wherein the at least one trigger condition corresponding to the specific visual content item is met based on the identified at least one display condition; displaying, by a light projection display device, the identified specific visual content item; and wirelessly transmitting the audio content item corresponding to the specific visual content item for audible emission by a mobile communication device.

33 Claims, 8 Drawing Sheets

(51) Int. Cl.
*G09G 5/00* (2006.01)
*G09G 3/00* (2006.01)

(58) Field of Classification Search
USPC ...................................... 345/522; 725/86, 87
See application file for complete search history.

(56) References Cited

U.S. PATENT DOCUMENTS

| | | | | |
|---|---|---|---|---|
| 2002/0103699 | A1 | 8/2002 | Ferreiro | |
| 2005/0228781 | A1 | 10/2005 | Chandrashekar et al. | |
| 2006/0020998 | A1 | 1/2006 | Bronstein et al. | |
| 2007/0011051 | A1 * | 1/2007 | Findlay .................. | G06Q 30/02 705/14.5 |
| 2007/0044127 | A1 * | 2/2007 | Vaysman ............... | H04N 7/163 725/86 |
| 2007/0270099 | A1 | 11/2007 | Le Gars | |
| 2008/0094310 | A1 * | 4/2008 | Shindo ................. | G11B 27/034 345/1.1 |
| 2009/0210385 | A1 * | 8/2009 | Ramaswamy ......... | G06Q 30/02 |
| 2009/0270033 | A1 | 10/2009 | Le Gars et al. | |
| 2010/0231507 | A1 * | 9/2010 | Roh ................... | H04B 7/15585 345/156 |
| 2011/0102387 | A1 | 5/2011 | Galligan et al. | |
| 2012/0013458 | A1 * | 1/2012 | Kanenari ............ | B60C 23/0471 340/447 |
| 2012/0050012 | A1 * | 3/2012 | Alsina ................ | H04N 21/4126 340/10.1 |
| 2012/0117584 | A1 * | 5/2012 | Gordon ................ | H04N 21/254 725/19 |
| 2013/0321422 | A1 * | 12/2013 | Pahwa .................. | G06T 11/203 345/428 |

OTHER PUBLICATIONS

European Search Report and Written Opinion issued by the European Patent Office on Oct. 31, 2016 in corresponding EP Application No. 14785166.1 (8 pages).

* cited by examiner

SYSTEM AND METHOD FOR THE DISTRIBUTION OF AUDIO AND PROJECTED VISUAL CONTENT

FIELD

The present disclosure relates to the distribution of audio and visual content, specifically the distribution of visual content for projection and the transmitting of accompanying audio content for emission by a mobile device.

BACKGROUND

Traditionally, display advertisements often came in the form of billboards, banners, and other similar large-format displays. Such displays often were able to reach a large number of people, and their size made them catch the eyes of passersby, helping to ensure that they would be seen. As technology developed, electronic billboards and large television displays were created and used in place of or in conjunction with existing large-format displays. These types of displays offer the advantage of playing video content and/or displaying multiple advertisements together concurrently or in sequence.

However, large electronic displays often suffer from a number of problems. The displays units themselves are often very large and cumbersome, and require a significant amount of time and resources to set up and configure. In addition, the time and expense necessary to install and configure these displays often result in higher costs to entities with a desire to advertise using these displays. Furthermore, because of the amount of hardware required, and the limitations thereof, such as weather, building materials, etc., many locations that may have utility as a location for display advertising are unable to house such types of displays.

In order to solve some of these issues, methods have been developed for using projectors to display visual advertisements. Devices have been developed that house a projector and other hardware that can be mounted on a vehicle and protected from the elements, and then used to project a display advertisement on a wall or other space at a fraction of the cost and resources used in traditional displays. An example of such a projector housing can be seen in U.S. Pat. No. 7,872,643, issued Jan. 18, 2011 to Galligan et al., which is herein incorporated by reference in its entirety. However, such systems often continue to only cater to large advertisers, and are typically limited to displaying a single or series of advertisements that is pre-determined without regard to specific conditions of the display or surrounding area. As a result, such systems also lack the functionality to be easily accessible to the average customer, who may have a desire to display visual content on a smaller, less expensive scale.

Thus, there is a need for a technical solution to provide for the customized and accessible distribution of audio content for emission and visual content for projected display.

SUMMARY

The present disclosure provides a description of systems and methods for projected display of visual content and distribution of audio and visual media.

A method for the projected display of visual content includes: receiving, by a receiving device, at least one visual content item to be displayed and at least one trigger condition for each of the at least one visual content item; storing, in a database, the received at least one visual content item and corresponding at least one trigger condition; identifying, by a processing device, at least one display condition of a plurality of display conditions; identifying, in the database, a specific visual content item, wherein the at least one trigger condition corresponding to the specific visual content item is met based on the identified at least one display condition; and displaying, by a light projection display device, the identified specific visual content item.

A method for the distribution of audio and visual media includes: receiving, by a receiving device, at least one visual content item to be displayed, and an audio content item and at least one trigger condition for each of the at least one visual content item; storing, in a database, the received at least one visual content item and corresponding audio content item and at least one trigger condition; identifying, by a processing device, at least one display condition of a plurality of display conditions; identifying, in the database, a specific visual content item, wherein the at least one trigger condition corresponding to the specific visual content item is met based on the identified at least one display condition; displaying, by a light projection display device, the identified specific visual content item; and wirelessly transmitting, by a transmitting device, the audio content item corresponding to the specific visual content item for audible emission by a mobile communication device.

A system for the projected display of visual content includes a receiving device, a database, a processing device, and a light projection display device. The receiving device is configured to receive at least one visual content item to be displayed and at least one trigger condition for each of the at least one visual content item. The database is configured to store the received at least one visual content item and corresponding at least one trigger condition. The processing device is configured to identify at least one display condition of a plurality of display conditions, and identify, in the database, a specific visual content item, wherein the at least one trigger condition corresponding to the specific visual content item is met based on the identified at least one display condition. The light projection display device is configured to display the identified specific visual content item.

A system for the distribution of audio and visual media includes a receiving device, a database, a processing device, a light projection display device, and a transmitting device. The receiving device is configured to receive at least one visual content item to be displayed and an audio content item and at least one trigger condition for each of the at least one visual content item. The database is configured to store the received at least one visual content item and corresponding audio content item and at least one trigger condition. The processing device is configured to identify at least one display condition of a plurality of display conditions, and identify, in the database, a specific visual content item, wherein the at least one trigger condition corresponding to the specific visual content item is met based on the identified at least one display condition. The light projection display device is configured to display the identified specific visual content item. The transmitting device is configured to wirelessly transmit the audio content item corresponding to the specific visual content item for audible emission by a mobile communication device.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Definition of Terms

Visual Content—Visual content may include any type of content that may be visually displayed, such as an image, graphic, icon, logo, video, sequence of images, moving image, etc, or a combination thereof. For example, visual content may include a video overlaid with a logo, icon, or graphic, may be a sequence of images or videos with additional content overlaid in some of the images or videos of the sequence, etc. Other types of visual content suitable for the projected display and distribution of as discussed herein will be apparent to persons having skill in the relevant art, and may include three-dimensional visual displays, holographic displays, advertisements, interactive displays, etc.

Audio Content—audio content may include any type of content suitable for audible emission, such as music, spoken words, noises, or other such content as will be apparent to persons having skill in the relevant art. Audio content for use in the systems and methods as discussed herein may be in any format suitable for the transmission and emission thereof, such as in an analog form or a digital form. For example, audio content may be an MP3 format file, an OGG format file, encoded as part of visual content (e.g., a video), etc. Additional types of audio content and protocols for the distribution and emission thereof will be apparent to persons having skill in the relevant art.

System for the Distribution of Audio and Visual Media

Figure 1:
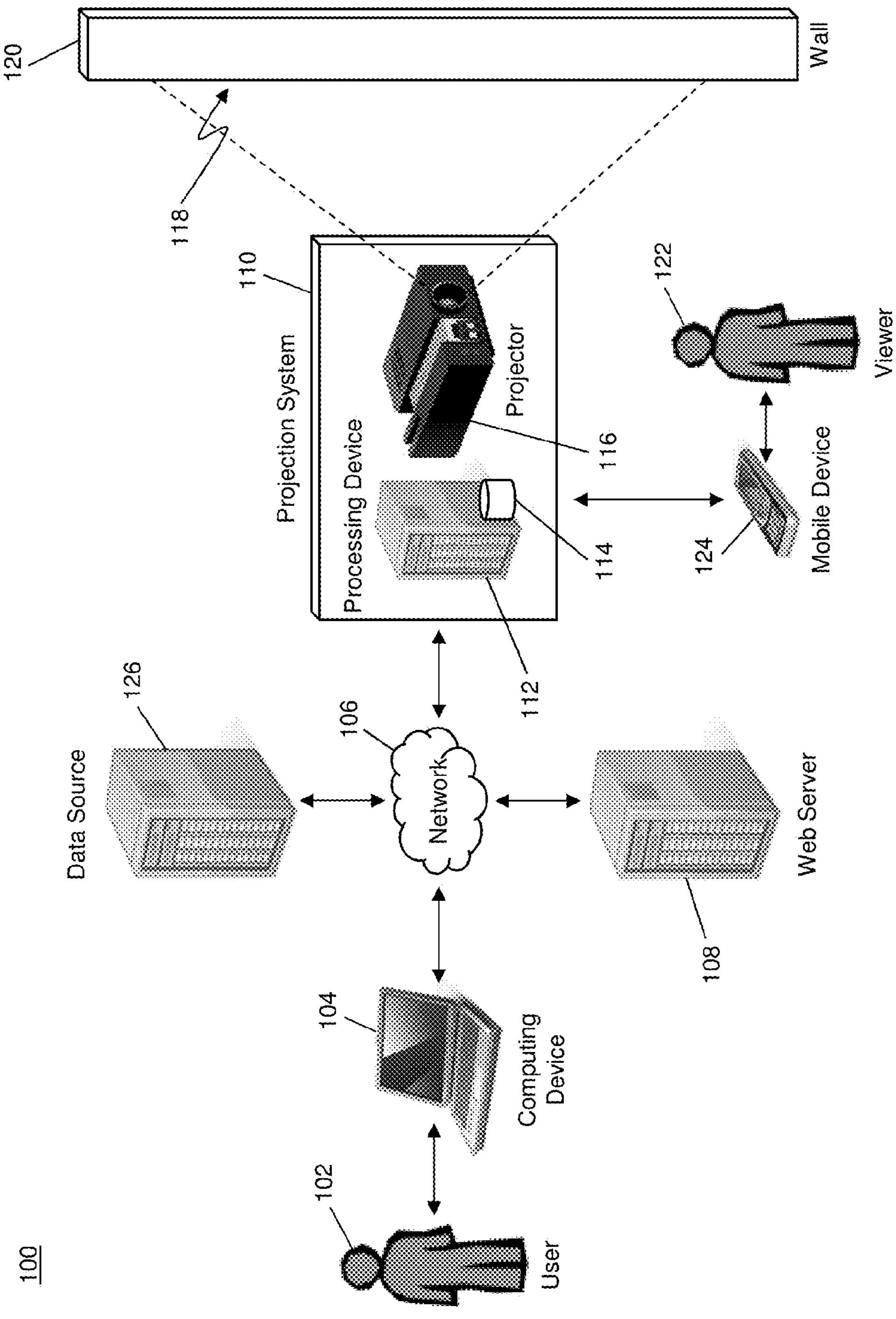
FIG. 1 is a high level architecture illustrating a system for the distribution of audio and visual media in accordance with exemplary embodiments.

FIG. 1 illustrates a system 100 for the distribution of audio media (e.g., content) for audible emission and visual media (e.g., content) for projected display.

The system 100 may include a user 102. The user 102 may be a person, company, partnership, corporation, or any entity desiring to have visual content distributed as a projected display. The user 102 may use a computing device 104 in order to submit visual content for projected display to a projection system 110. In some embodiments, the user 102 may also use the computing device 104 to submit audio content associated with the visual content for transmission during the projected display of the visual content. In some instances, the audio content may be stored locally in the computing device 104, or externally and accessed via a network 106.

The network 106 may be any type of network suitable for performing the functions as disclosed herein, such as a local area network (LAN), wireless network, the Internet, WiFi, radio frequency network, Bluetooth, coaxial cable, etc. In an exemplary embodiment, the network 106 may be the Internet. The user 102 may use the computing device 104 to access a website via the network 106. The website may be hosted by a web server 108 operated by or on behalf of the projection system 110. The user 102 may then, via the website, provide (e.g., upload, submit, etc.) one or more visual content items for projected display. The user 102 may also provide one or more trigger conditions, which may be display conditions that must be met and/or fulfilled in order to trigger the projected display of the corresponding visual content. The use of trigger and display conditions is discussed in more detail below. The web server 108 may receive the submission and may, via the network 106, provide the content and corresponding conditions to the projection system 110.

The projection system 110 may include at least a processing device 112 and a projector 116. The processing device 112, discussed in more detail below, may receive the visual content (e.g., and any associated audio content) and corresponding conditions and store the received content in a content database 114. The processing device 112 may be further configured to identify a plurality of display conditions. Display conditions may include, for example, time, date, weather conditions, population density, the detection of a signal, etc. It will be apparent to persons having skill in the relevant art that the processing device 112 may include or otherwise in communication with (e.g., via the network 106 or as part of the projection system 110) a variety of components configured to identify various display conditions. For example, the processing device 112 or the projection system 110 may include a thermometer for the identifying of a temperature of the area in which the projection system 110 is located. In some instances, the processing device 112 may be configured to receive the information via the network 106 from an external data source, such as the data source 126.

The processing device 112 may determine when the trigger conditions corresponding to the received visual content has been met, and then may cause the projector 116 to display the visual content. The projector 116 may project the visual content as projected content 118 on a wall 120 or other surface suitable for the display of projected visual content. The use of such a system, where the user 102 may supply visual content to the projection system 110 via an Internet website, may enable a user to more quickly and efficiently provide visual content for projected display. In addition, by the use of display and trigger conditions, the display of visual content may be customized to be performed only when certain conditions are met, which may result in more effective advertising, the display of customized non-advertisement content, and may result in a system that is more accessible by the average consumer.

For example, the user 102 as an average person (e.g., rather than an advertiser, merchant, etc.) may provide a birthday message to be displayed at a specific time and location when the user 102 knows the person having the birthday will be in view of the projected display. Additionally, the system 100 may provide for the quicker display of visual content. For example, the user 102 may lose their dog. In an effort to find their beloved pet as quickly as possible, the user 102 may access the website via the network 106 and may submit a flyer to inform of the lost dog indicating that it is to be displayed immediately. The content may be forwarded directly to the projection system 110 and may be quickly displayed at the requested location.

In some embodiments, the user 102 may submit audio content corresponding to the visual content using the computing device 104. The audio content may be transmitted along with the corresponding visual content to the processing device 112 of the projection system 110, which may store the audio and visual content together in the content database 114. Then, when the visual content is projected by the projector 116, the processing device 112 (e.g., or another device included as part of the projection system 110) may transmit the audio content to one or more mobile devices 124, which may be in possession of one or more viewers 122 viewing the projected content 118.

Methods suitable for transmitting the audio content to the mobile device 124 will be apparent to persons having skill in the relevant art, such as by the mobile device 124 connecting to a local area network operated by or including the processing device 112, receiving the audio content via an application program executed by the mobile device 124, connecting to the processing device 112 and receiving the audio content via a wireless protocol (e.g., Bluetooth), etc. In some instances, the mobile device 124 may initiate the receipt of the audio content, such as by connecting to a network, scanning a machine-readable code (e.g., displayed as part of the projected display 118, etc.). In an exemplary embodiment, the audio content may be transmitted to the mobile device 124 such that emission by the mobile device 124 will be synchronized with the projected display 118. The synchronized emission of the audio content may mean, for example, that the audio content is emitted without any latency between the corresponding visual content item and the emission of the audio content. For example, if the video content item includes a music video to be displayed as the projected display 118, the transmission of the song corresponding to the music video may be made to the mobile device 124 such that the song is emitted by the mobile device 124 "to the beat" with the displayed music video.

In some embodiments, the user 102 may provide additional content to be distributed by the processing device 112 to mobile devices 124 during the projection of the visual content. For example, the visual content supplied by the user 102 may be a commercial or other informative video for a product available for purchase. The user 102 may supply a brochure or informative pamphlet, which the processing device 112 may distribute to the mobile device 124 when the visual content is being displayed. The mobile device 124 may be a smart phone, tablet computer, notebook computer, digital music player, or any other device suitable for performing the functions as disclosed herein as will be apparent to persons having skill in the relevant art.

Projection System

Figure 2:
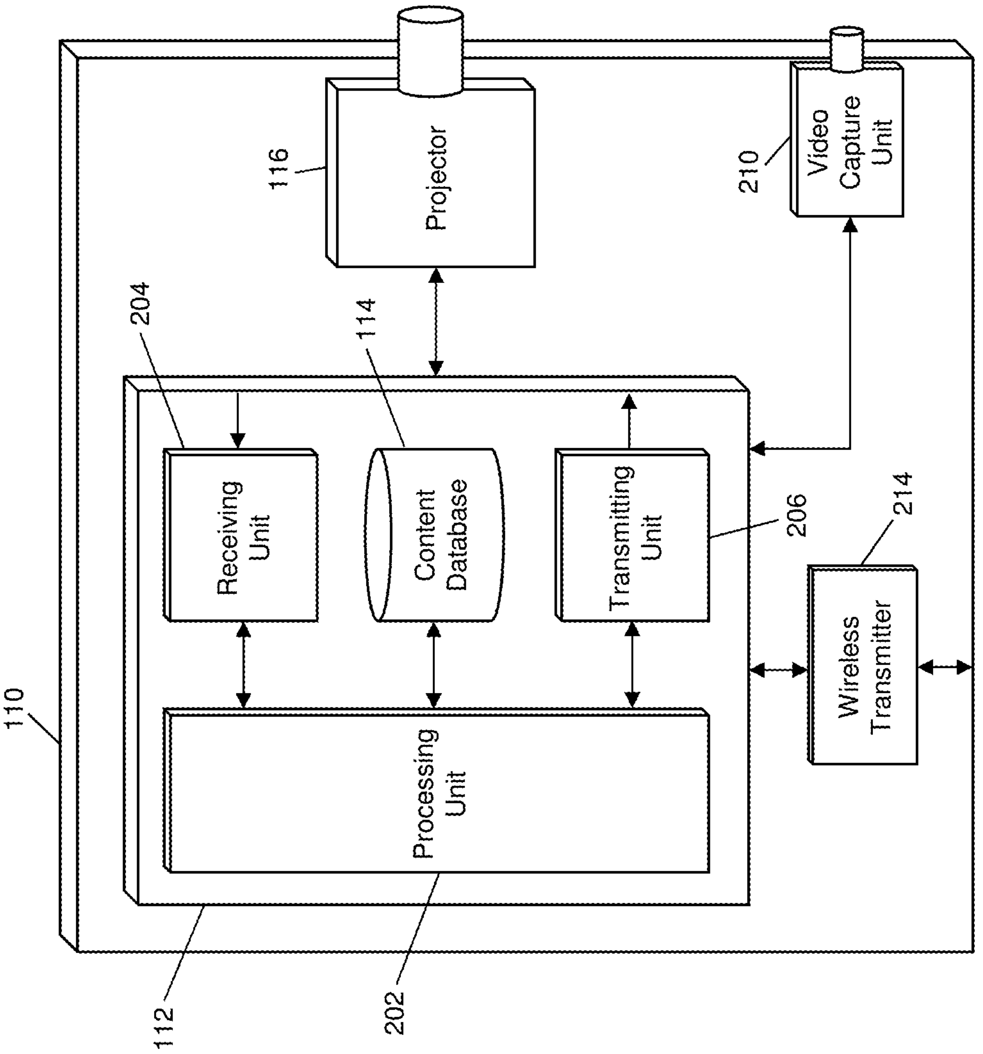
FIG. 2 is a block diagram illustrating the projection system of FIG. 1 for the distribution of audio media and projected display of visual content in accordance with exemplary embodiments.

FIG. 2 illustrates an embodiment of the projection system 110 for the distribution of the audio and visual content supplied by the user 102 in the system 100. It will be apparent to persons having skill in the relevant art that the configuration illustrated in FIG. 2 of the projection system 110 is provided as an illustration only and that other suitable configurations may be used to perform the functions as disclosed herein. Such other configurations will be apparent to persons having skill in the relevant art.

The projection system 110 may include the processing device 112. The processing device 112 may be any type of processing device suitable for performing the functions as disclosed herein, such as a general purpose computer configured to perform the disclosed functions, a special purpose computer, etc. Suitable configurations will be apparent to persons having skill in the relevant art. The processing device 112 may include a processing unit 202 and a receiving unit 204. The receiving unit 204 may be configured to receive the visual content, audio content, and corresponding trigger conditions via the network 106. The processing unit 202 may be configured to store the received content and conditions in the content database 114. The content database 114 may be included as part of the processing device 112, or may be external to the processing device 112 (e.g., and included in, or external to, the projection system 110). Suitable configurations of the content database 114 will be apparent to persons having skill in the relevant art.

The processing unit 202 may be further configured to identify at least one display condition. In some instances, the processing unit 202 may communicate with one or more devices or units external to the processing device 112 and/or the projection system 110 in order to identify the at least one display condition. For example, the processing unit 202 may cause the receiving unit 204 to receive condition information from the data source 126 via the network 106.

The processing unit 202 may be configured to cause a transmitting unit 206 to transmit visual content for projected display by the projector 116 once the trigger conditions corresponding to the visual content have been met based on the identified at least one display condition. The transmitting unit 206 may be further configured to communicate with other devices or units included as part of the projection system 110. For example, the projection system 110 may include a wireless transmitter 214. The wireless transmitter 214 may be configured to receive audio content transmitted to it via the transmitting unit 206 of the processing device 112, and then wirelessly transmit the audio content to one or more mobile devices 124. Suitable devices for use as the wireless transmitter 214 will be apparent to persons having skill in the relevant art. In some embodiments, the wireless transmitter 214 may be configured to transmit the audio content to the mobile device 124 without latency between the audio content emitted by the mobile device 124 and the corresponding displayed visual content item.

The projection system 110 may also include the projector 116. The projector 116 may be any type of projector suitable for the projected display of visual content and may utilize any suitable method for projecting visual content as will be apparent to persons having skill in the relevant art. In some instances, the projector 116 may include a plurality of projectors configured to project the visual content. For example, the projector 116 may use multiple projectors to project the entirety of the visual content in order to increase the intensity of the projected display 118. In other instances, each projector of a plurality of projectors may be configured to project a portion of the visual image, which, when working together, may result in the projection of the full projected display 118. Suitable configurations and methods for displaying the projected display 118 using multiple projectors will be apparent to persons having skill in the relevant art.

The projection system 110 may also include a video capture unit 210. The video capture unit 210 may be configured to capture images or video of the projected display 118 and/or surrounding area. The video capture unit 210 may provide the captured images or video to the processing server 112, which may receive the captured images or video (e.g., via the receiving unit 204) and transmit (e.g., via the transmitting unit 206) the captured images or video to the user 102 that supplied the content included in the projected display 118. For example, the user 102 may provide visual and audio content and request that a live video capture of the display of the visual content be provided, to ensure the successful display of the visual content. The video capture unit 210 may capture video of the projected display 118 and surrounding area (e.g., showing viewers 122 viewing the projected display 118), which the processing device 112 may then transmit (e.g., via the network 106) to the web server 108. The user 102 may then, using the computing device 104, view the captured video via a website hosted by the web server 108 to verify the display of their supplied content.

Method for the Projected Display of Visual Content

Figure 3:
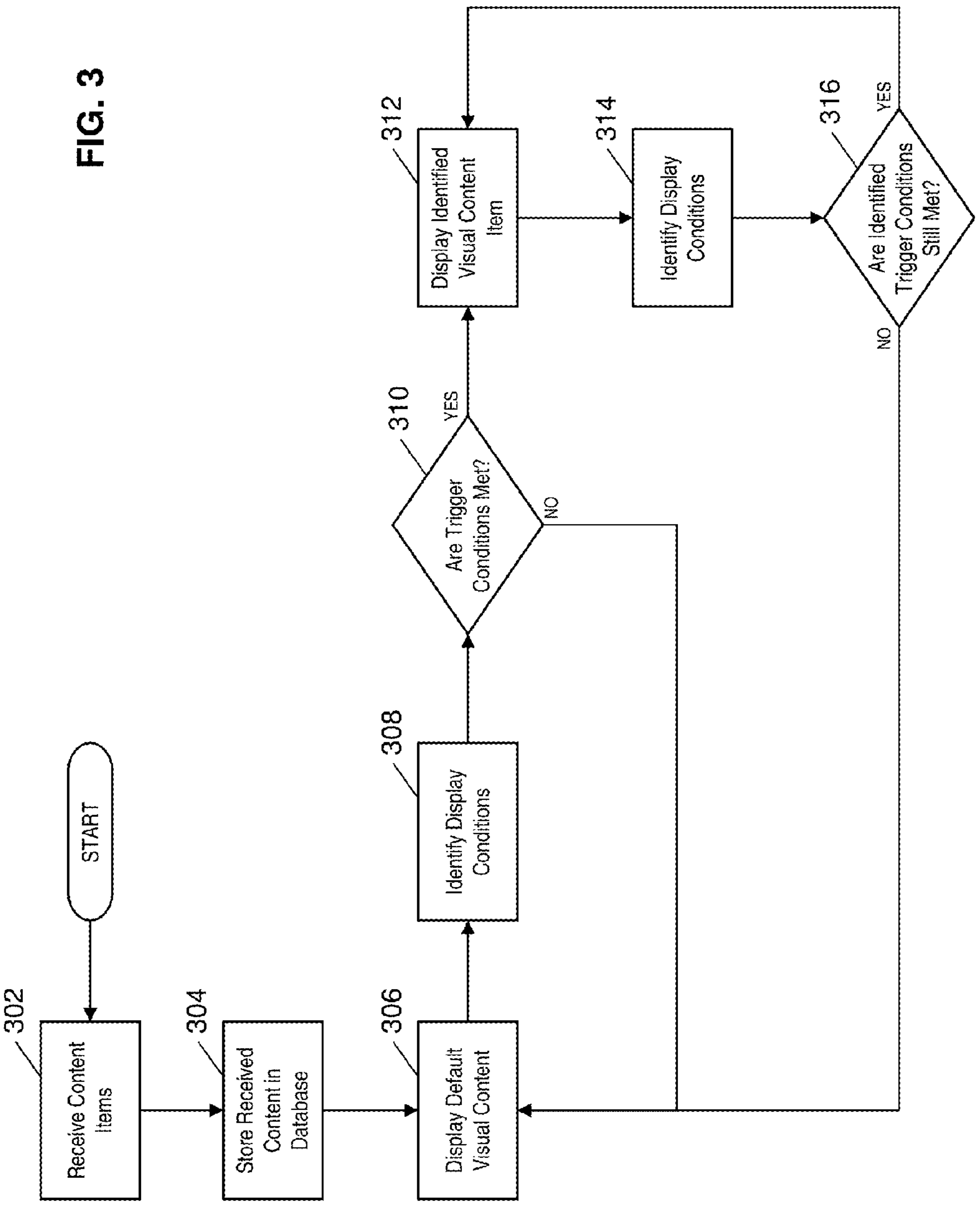
FIG. 3 is a flow diagram illustrating a method for the projected display of visual content in accordance with exemplary embodiments.

FIG. 3 illustrates a method for the projected display of visual content supplied by the user 102 and displayed by the projection system 110 of FIGS. 1 and 2.

In step 302, the processing device 112 of the projection system 110 may receive content items supplied by the user 102 (e.g., via the web server 108 and/or the network 106). The content items may include the visual content to be displayed and at least one trigger condition corresponding to the visual content. In some embodiments, the content items may also include audio content to be transmitted along with the display of the visual content.

In step 304, the processing device 112 may store the received content items in the content database 114. Then, in step 306, the projection system 110 may display (e.g., via the projector 116) default visual content. For example, the content database 114 may include visual content (e.g., an image advertisement) that is to be the default projected display 118 when the trigger conditions for any supplied content are not met.

In step 308, the processing device 112 may identify at least one display condition of a plurality of display conditions. Then, in step 310, the processing device 112 may identify if the trigger conditions corresponding to any visual media stored in the content database 114 are met based on the identified at least one display condition. For example, visual content supplied by the user 102 may have trigger conditions corresponding such that the visual content is only to be displayed between four and six in the evening. If the processing device 112 determines that the trigger conditions have not been met for any stored visual content, then the process may return to step 306 where the processing device 112 will continue to display the default visual content and await the fulfillment of the trigger conditions for other visual content.

If, in step 310, the processing device 112 determines that the trigger conditions have been met for stored visual content, then, in step 312, the projector 116 of the projection system 110 may display the visual content as the projected display 118. In some instances, the processing device 112 may, in step 310, identify a plurality of visual content items whose trigger conditions have been met. In such an instance, each visual content item may include a corresponding bid value. The processing device 112 may then identify a specific visual content item for display in step 312 based on the corresponding bid value of each visual content item of the plurality of visual content items.

In such an embodiment, users 102 may request the display of visual content based specific conditions and bid for the ability to be displayed when those conditions are met. For example, a first user may supply visual content to be displayed any time after 5 pm and bid $100. A second user may supply visual content to be displayed any time after 5 pm and bid $200. In such an instance, once the time has passed 5 pm, the visual content supplied by the second user may be displayed. In a further example, a third use may supply visual content to be displayed any time after 5 pm and the weather is sunny, and bid $300. In such an instance, the projector 116 may display the content supplies by the second user until the processing device 112 identifies that it is sunny in the area of the projection system 110, at which time the content supplied by the third user may be displayed. It will be apparent to persons having skill in the relevant art that other bid and/or purchasing systems may be utilized by the projection system 110 for the distribution of audio and visual media. For example, users 102 may be charged a rate based on the selected trigger conditions, may purchase an exclusive time or display condition for the display of their visual content, etc.

Once the visual content is displayed by the projector 116 in step 312, then, in step 314, the processing device 112 may identify the at least one display condition again. In step 316, the processing device 112 may identify if the trigger conditions for the visual content being displayed are still met. If not, then the processing device 112 may cause the projector 116 to once again display the default visual content. If the trigger conditions are still met, then the process may return to step 312 where the visual content is continued to be displayed. In some instances, the processing device 112 may, in step 316, identify that the trigger conditions for an additional piece of stored visual content have been met, and may then select one of the eligible visual content items for display (e.g., based on bid values).

It should be apparent to persons having skill in the relevant art that, in instances where visual content may be associated with audio content, the processing device 112 may also transmit the audio content corresponding to the displayed visual content item to mobile devices 124 (e.g., as part of steps 306 and 312). The processing device 112 may also distribute additional content in a similar fashion as the transmitting of audio content during the display of a corresponding visual content item.

Graphical User Interface

Figure 4A:
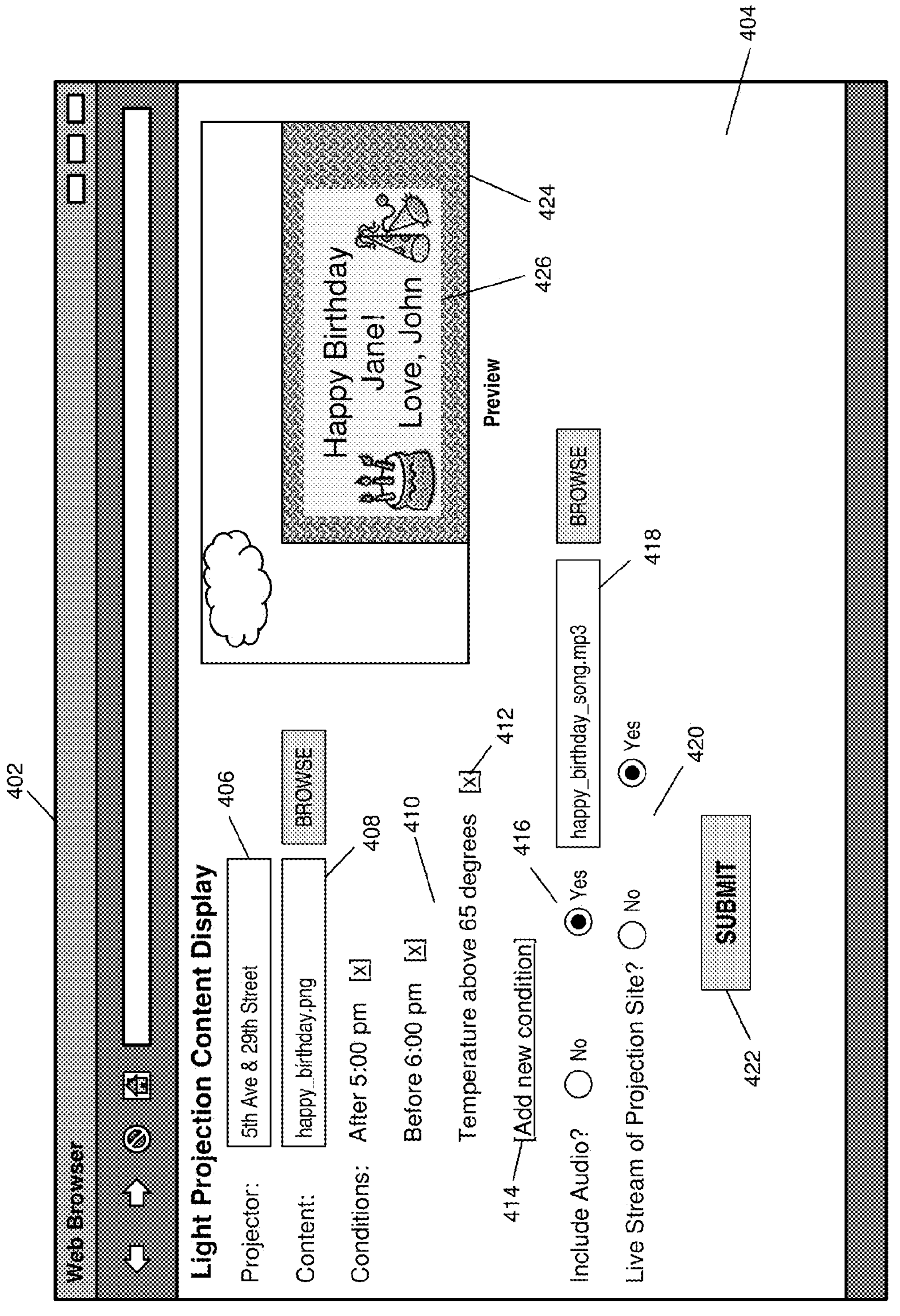
FIGS. 4A and 4B are illustrations of a graphical user interface for the providing of visual and audio content by a user for projected display and distribution in accordance with exemplary embodiments.

FIG. 4A is an illustration of a graphical user interface for the providing of visual and audio content to the projection system 110 for distribution. It will be apparent to persons having skill in the relevant art that the interface depicted in FIG. 4A is provided as an example only and that other interfaces suitable for performing the functions as disclosed herein may be used.

The computing device 104, such as a desktop computer, laptop computer, notebook computer, tablet computer, smart phone, etc. may include a web browsing application or other application program configured to provide a web browser 402 to the user for viewing a webpage 404. The webpage 404 may be operated (e.g., hosted) by the web server 108 and accessed by the web browser 402 of the computing device 104 by the user 102 via the network 106.

The webpage 404 may include a projector field 406. The projector field 406 may be a field in which the user 102 can enter the projection system 110 that the user 102 would like to use to distribute their content. In some embodiments, the projector field 406 may be a drop-down box or other type of selection tool, such as to select from a pre-existing list of projection systems 110.

The webpage 404 may also include a visual content field 408. The visual content field 408 may be configured to enable the user 102 to select a visual content item from the computing device 104, or from the data source 126 via the network 106, that the user 102 wishes to display using the projection system 110. It will be apparent to persons having skill in the relevant art that the format (e.g., file format, file size, etc.) of the visual content item may be restricted.

The webpage 404 may also include a plurality of trigger conditions 410 selected by the user 102. Each of the trigger conditions 410 may be a display condition that must be met in order for the visual content item supplied in the visual content field 408 to be displayed by the projector 116. It will be apparent to persons having skill in the relevant art that the trigger conditions 410 may include as many or as little conditions as desired by the user 102. Each trigger condition 410 may include a delete button 412, which, when interacted with by the user 102, may remove the corresponding trigger condition 410. The webpage 404 may also include an add condition button 414, which may present the user 102 with a window or new webpage for selecting an additional trigger condition to be added to the trigger conditions 410.

The webpage 404 may further include an audio selection 416. The audio selection 416 may enable the user 102 to select if audio content is to be transmitted for audible emission when the supplied visual content item is to be projected. If the user 102 indicates that audio content is to be included, then the webpage 404 may include an audio content field 418, where the user may select (e.g., on the computing device 104, etc.) audio content to accompany the supplied visual content.

The webpage 404 may also include a live stream selection 420. The live stream selection 420 may enable the user 102 to select if they desire to view a live stream of the projected display 118, which is to be displayed once the trigger conditions 410 have been met. In some instances, the live stream may be viewed via a webpage, such as one hosted by the web server 108. In one embodiment, the webpage 404 may also include an e-mail address or other contact information for the receipt of information as to how to access the requested live stream.

The webpage 404 may also include a submit button 422. The submit button 422 may be such that, when interacted with by the user 102, the information (e.g., content items) supplied by the user 102 is transmitted to the processing device 112 for storage in the content database 114. The webpage 404 may also include a preview window 424. The preview window 424 may be an image (e.g., a computer-generated image) simulating the area of the projection system 110 including the projected display 118. The preview window 424 may include an image 426 of the visual content item selected by the user 102 via the visual content field 408, such that the user 102 may be able to view an approximation of how the visual content will look once it is projected by the projection system 110.

Figure 4B:
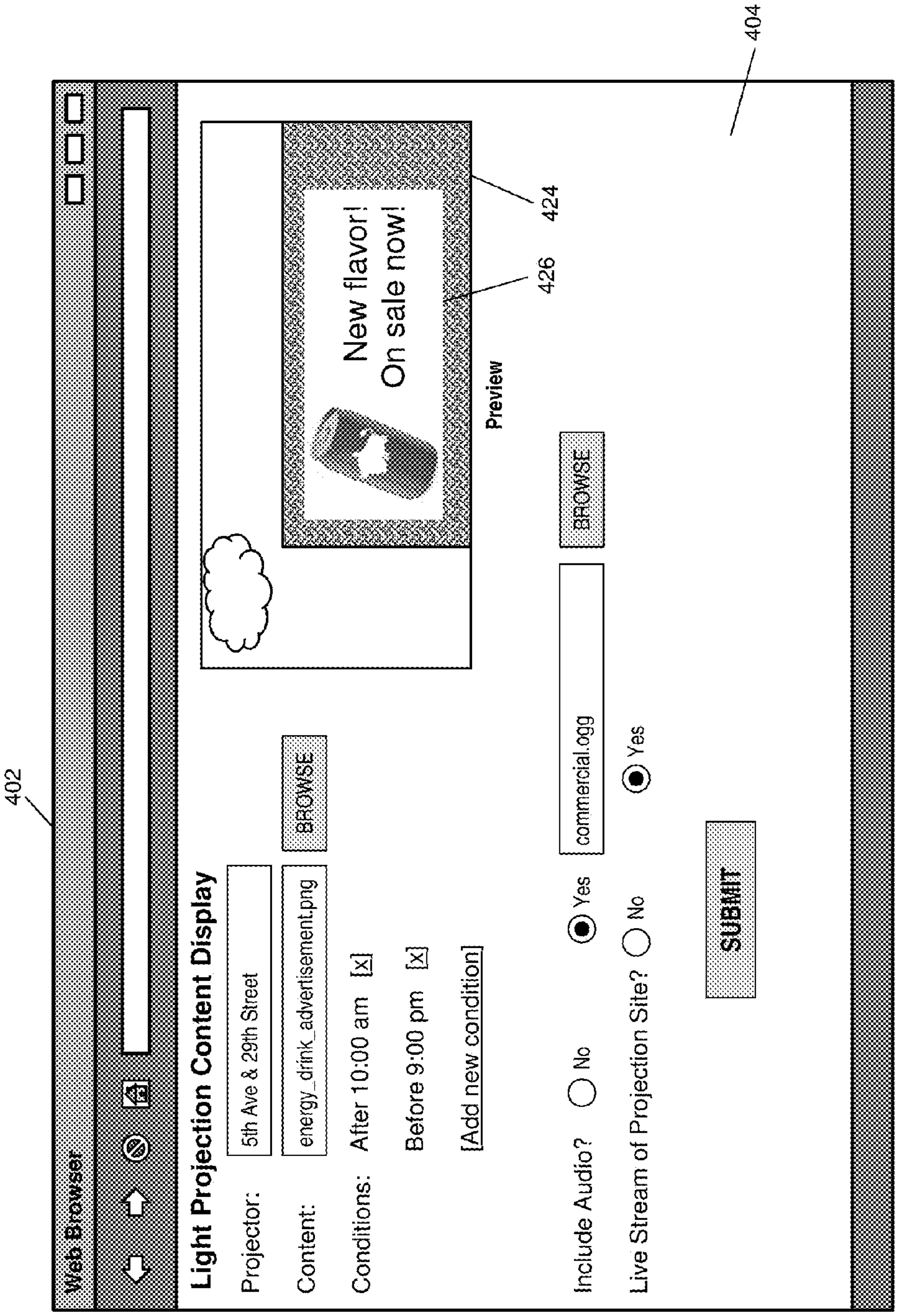

FIG. 4B is an illustration of an alternative embodiment of the interface webpage 404 of the web browser 402. As illustrated in FIG. 4B, the user 102 may be an advertiser, such as a product manufacturer. The user 102 may select a visual content item that may be an advertisement for a consumer product, such as an energy drink. For example, the image 426 in the preview window 424 may depict the product offered for sale by the user 102 as part of the advertisement, as well as a slogan. In some instances, the visual content item may be a video, such as a commercial highlighting the product offered for sale. It will be apparent to persons having skill in the relevant art that the video content item displayed using the systems and methods disclosed herein may vary dependent on application.

Figure 5:
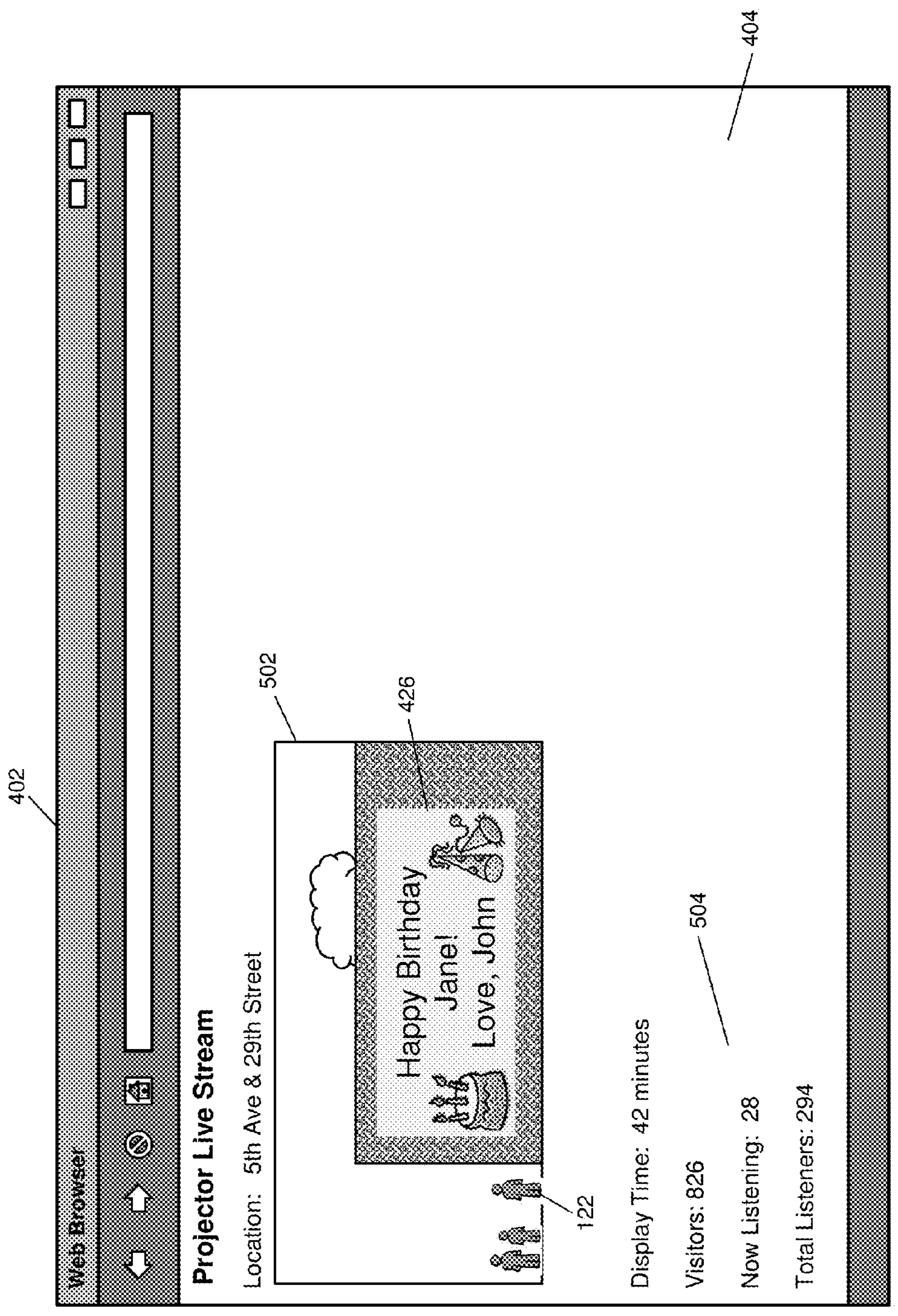
FIG. 5 is an illustration of a graphical user interface for the viewing of a live capture of a projected visual display in accordance with exemplary embodiments.

FIG. 5 is an illustration of a graphical user interface for the live stream of the projected display 118 including the visual content item supplied by the user 102 and surrounding area. It will be apparent to persons having skill in the relevant art that the interface depicted in FIG. 5 is provided as an example only and that other interfaces suitable for performing the functions as disclosed herein may be used.

As illustrated in FIG. 5, the webpage 404 may display to the user 102 a live stream of the projection area. As such, the webpage 404 may include a viewing window 502. The viewing window 502 may include a video (e.g., which may be pre-recorded, live, a series of images, etc.) of the projected display 118 including the image 426 of the supplied visual content item, such as captured by the video capture unit 210 of the projection system 110. The viewing window 502 may be such that it includes additional area surrounding the projected display 118, such as to include viewers 122 viewing the image 426. It will be apparent to persons having skill in the relevant art that the area captured by the video capture unit 210 may be dependent on the specific application and may be selected based on criteria provided by the user 102.

The webpage 404 may also include projection details 504. The projection details 504 may include any information, statistics, metrics, etc. related to the distribution of the supplied content items. For example, as illustrated in FIG. 5 the projection details 504 may include the length of time that the supplied visual content item has been displayed, the number of viewers 122 that have been in an area suitable for viewing the supplied visual content item, the number of mobile devices 124 currently connected to the processing device 112 for receipt of the supplied audio content, and the total number of mobile devices 124 that have received the supplied audio content. Additional information that may be included in the projection details 504 will be apparent to persons having skill in the relevant art and may include demographic information of the viewers 122, information regarding the mobile devices 124 that have received the audio content, information regarding mobile devices 124 that have received additional content, methods of access of the audio or additional content by the mobile devices 124 (e.g., WiFi, application programs, reading of machine-readable codes, etc.).

It will be further apparent that such information, statistics, metrics, etc. may be provided by the processing server 112 to additional users 102. For example, a user 102 such as an advertiser may request a projection system 110 that is in a high traffic area for a certain demographic, which may be identified by such information gathered by the projection systems 110. Types of information gathered at the sites of the projection systems 110 and possible uses for such information will be apparent to persons having skill in the relevant art.

In some instances, the webpage 404 may also display social media information regarding the projected display 118. For example, viewers 122 may post to social media sources (e.g., Facebook®, Twitter®, Foursquare®, etc.) regarding the projected display 118, such as via the mobile device 124, by reading a machine-readable code displayed as part of the projected display 118, etc. The processing device 112 may access social media information from one or more data sources 126. The social media information may then be displayed on the webpage 404, such as to enable the user 102 to see what viewers think of the supplied visual and/or audio content items. In some embodiments, the projector 116 may also project social media information as part of the projected display 118. Methods for including additional information, such as the social media information, as part of the projected display 118 will be apparent to persons having skill in the relevant art.

In some embodiments, the projected display 118 may also include a machine-readable code. The machine-readable code may be encoded with data such that, when read by the mobile device 124, causes the mobile device 124 to execute a command, such as opening an application program, navigating to a webpage, etc. For example, the command may cause the mobile device 124 to navigate to a webpage or open an application program where the viewer 122 using the mobile device 124 may make a donation to a charitable organization depicted in the projected display 118. In such an instance, a viewer 122 may be able to quickly donate to a worthy cause right as they are seeing the display in front of them, rather than having to remember the cause until they arrive at a location suitable for finding a way to donate to the cause. It will be apparent to persons having skill in the relevant art that additional methods may be suitable for processing such a donation, such as by the mobile device 124 receiving a signal via wireless transmission, radio frequency, near field communication, etc. that may be requested by the mobile device 124 or transmitted to the mobile device 124 by the processing server 112.

Exemplary Method for the Projected Display of Visual Content

Figure 6:
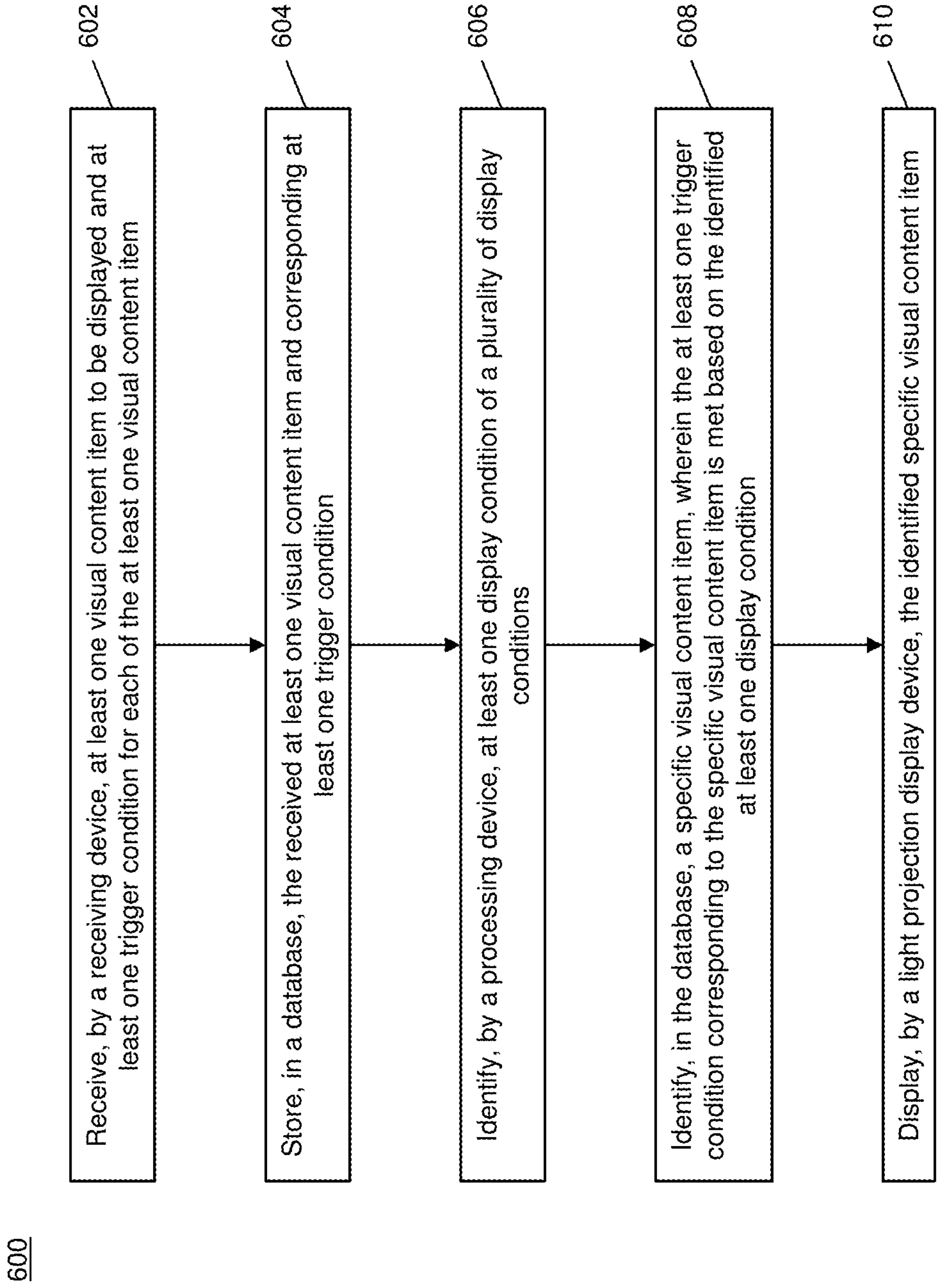
FIG. 6 is a flow chart illustrating an exemplary method for the projected display of visual content in accordance with exemplary embodiments.

FIG. 6 illustrates a method 600 for the projected display of visual content.

In step 602, at least one visual content item to be displayed and at least one trigger condition for each of the at least one visual content item may be received by a receiving device (e.g., the receiving unit 204). In one embodiment, the at least one trigger condition is one of: a time, date, temperature, season, weather condition, population density, receipt of a signal from a mobile device (e.g., the mobile device 124), and reading of a machine-readable code. In step 604, the received at least one visual content item and corresponding at least one trigger condition may be stored in a database (e.g., the content database 114).

In step 606, a processing device (e.g., the processing unit 202) may identify at least one display condition of a plurality of display conditions. In one embodiment, the at least one display condition is one of: a time, date, temperature, season, weather condition, population density, receipt of a signal from a mobile device (e.g., the mobile device 124), and reading of a machine-readable code. In step 608, a specific visual content item may be identified in the database 114, wherein the at least one trigger condition corresponding to the specific visual content item is met based on the identified at least one display condition. In one embodiment, the received at least one visual content item may further include, for each of the received at least one visual content item, a bid value. In such an embodiment, step 608 may further include identifying a set of visual content items, wherein the at least one trigger condition corresponding to each visual content item in the set of visual content items is met based on the identified at least one display condition, and identifying, in the set of visual content items, the specific visual content item based on the bid value corresponding to each visual content item in the set of visual content items.

In step 610, the identified specific visual content item may be displayed by a light projection display device (e.g., the projector 116). In one embodiment, step 602 may further include receiving, for each of the at least one visual content item, an accompanying additional content item. In such an embodiment, the method 600 may further include receiving, by the receiving device 204, a request for additional content, identifying, by the processing device 202, a specific additional content item accompanying the identified specific visual content item, and transmitting, by a transmitting device (e.g., the transmitting unit 206), the identified specific visual content item. In a further embodiment, the request for additional content may include a content identifier, the specific additional content item may be associated, in the database 114, with the content identifier, and the specific visual content item may include a machine-readable code encoded with the content identifier.

In another embodiment, the method 600 may further include receiving, by the receiving device 204, an additional content item associated with the displayed specific visual content item, and displaying, concurrently with the specific visual content item, the received additional content item. In a further embodiment, the additional content item may include social media data.

In yet another embodiment, the method 600 may further include capturing, by a video capture device (e.g., the video capture unit 210), a video, wherein the video includes captured images including the display of the specific visual content item by the light projection display device 116, and transmitting, by a transmitting device 206, the captured video.

Exemplary Method for the Distribution of Audio and Visual Media

Figure 7:
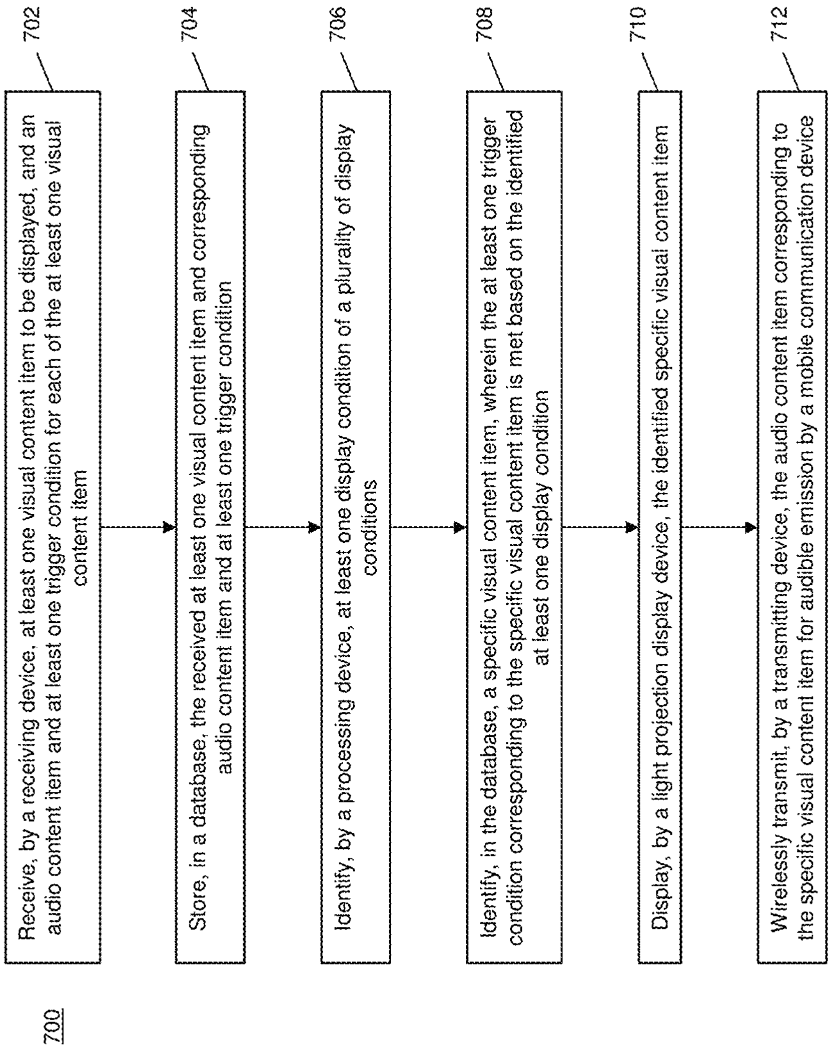
FIG. 7 is a flow chart illustrating an exemplary method for the distribution of audio and visual media in accordance with exemplary embodiments.

FIG. 7 illustrates a method 700 for the projected display of visual content.

In step 702, at least one visual content item to be displayed and an audio content item and at least one trigger condition for each of the at least one visual content item may be received by a receiving device (e.g., the receiving unit 204). In one embodiment, the at least one trigger condition is one of: a time, date, temperature, season, weather condition, population density, receipt of a signal from a mobile device (e.g., the mobile device 124), and reading of a machine-readable code. In step 704, the received at least one visual content item and corresponding audio content item and at least one trigger condition may be stored in a database (e.g., the content database 114).

In step 706, a processing device (e.g., the processing unit 202) may identify at least one display condition of a plurality of display conditions. In one embodiment, the at least one display condition is one of: a time, date, temperature, season, weather condition, population density, receipt of a signal from a mobile device (e.g., the mobile device 124), and reading of a machine-readable code. In step 708, a specific visual content item may be identified in the database 114, wherein the at least one trigger condition corresponding to the specific visual content item is met based on the identified at least one display condition. In one embodiment, the received at least one visual content item may further include, for each of the received at least one visual content item, a bid value. In such an embodiment, step 708 may further include identifying a set of visual content items, wherein the at least one trigger condition corresponding to each visual content item in the set of visual content items is met based on the identified at least one display condition, and identifying, in the set of visual content items, the specific visual content item based on the bid value corresponding to each visual content item in the set of visual content items.

In step 710, the identified specific visual content item may be displayed by a light projection display device (e.g., the projector 116). In step 712, the audio content item corresponding to the specific visual content item may be wirelessly transmitted, by a transmitting device (e.g., the transmitting unit 206) for audible emission by a mobile communication device (e.g., the mobile device 124). In some embodiments, the mobile communication device 124 may be configured to audibly emit the audio content item via an application program executed by a processor of the mobile communication device 124. In one embodiment, the audio content item may be transmitted to the mobile communication device 124 such that the audio content is audible emitted in synchronization with the visual content item displayed by the light projection display device without latency.

In one embodiment, step 702 may further include receiving, for each of the at least one visual content item, an accompanying additional content item. In such an embodiment, the method 700 may further include receiving, by the receiving device 204, a request for additional content, identifying, by the processing device 202, a specific additional content item accompanying the identified specific visual content item, and transmitting, by the transmitting device 206, the identified specific visual content item. In a further embodiment, the request for additional content may include a content identifier, the specific additional content item may be associated, in the database 114, with the content identifier, and the specific visual content item may include a machine-readable code encoded with the content identifier.

In another embodiment, the method 700 may further include receiving, by the receiving device 204, an additional content item associated with the displayed specific visual content item, and displaying, concurrently with the specific visual content item, the received additional content item. In a further embodiment, the additional content item may include social media data.

In yet another embodiment, the method 700 may further include capturing, by a video capture device (e.g., the video capture unit 210), a video, wherein the video includes captured images including the display of the specific visual content item by the light projection display device 116, and transmitting, by the transmitting device 206, the captured video.

Techniques consistent with the present disclosure provide, among other features, systems and methods for the projected display of visual content and the distribution of audio and visual media. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for display of visual content, comprising:

receiving, by a receiving device, at least one visual content item to be displayed;

receiving, by the receiving device, for each of the at least one visual content item, an accompanying additional visual content item, wherein an additional visual content item includes further details about a respective visual content item;

receiving, by the receiving device, at least one trigger condition for each of the at least one visual content item from an upload device, wherein the at least one trigger condition includes receipt of a signal from a trigger device, wherein the trigger device and the upload device are different devices;

storing, in a database, the received at least one visual content item and corresponding at least one trigger condition;

determining, by a processing device, that at least one display condition of a plurality of display conditions satisfies the at least one trigger condition, wherein the at least one display condition includes receipt of a trigger signal from the trigger device;

identifying, in the database, a specific visual content item, in response to the determination that the at least one trigger condition corresponding to the specific visual content item is met based on the at least one display condition;

displaying, by a display device, the identified specific visual content item, which includes at least a machine-readable code encoded with at least a content identifier; and receiving, by the receiving device, from a requesting device, a request for additional content, wherein said request includes the content identifier, wherein a specific additional visual content item is associated, in the database, with the content identifier, and wherein the request for additional content includes the content identifier.

2. The method of claim 1, further comprising:

identifying, by the processing device, the specific additional visual content item accompanying the identified specific visual content item when the content identifier included in the request corresponds to the content identifier associated with the specific additional visual content item; and transmitting, by a transmitting device, the identified specific additional visual content item to the requesting device.

3. The method of claim 1, further comprising:

receiving, by the receiving device, an additional content item associated with the displayed specific visual content item; and displaying, concurrently with the specific visual content item, the received additional visual content item, wherein the additional visual content item is displayed in an overlaid manner with respect to the specific visual content item.

4. The method of claim 1, further comprising:

capturing, by a video capture device, a video, wherein the video includes captured images including the display of the specific visual content item by the display device; and transmitting, by a transmitting device, the captured video.

5. The method of claim 1, wherein receiving the at least one visual content item further includes receiving, for each of the at least one visual content item, a bid value, and identifying the specific visual content item further includes identifying a set of visual content items, wherein the at least one trigger condition corresponding to each visual content item in the set of visual content items is met based on the identified at least one display condition, and identifying, in the set of visual content items, the specific visual content item based on the bid value corresponding to each visual content item in the set of visual content items.

6. The method of claim 1, wherein the at least one trigger condition further includes one of: a time, date, temperature, season, weather condition, population density, detection of a mobile device, and reading of a machine-readable code.

7. The method of claim 1, wherein the plurality of display conditions includes at least one of: a time, date, temperature, season, weather condition, population density, receipt of a signal from a mobile device, detection of a mobile device, and reading a machine-readable code.

8. A system for display of visual content, comprising:

a receiving device configured to:

receive at least one visual content item to be displayed, receive, for each of the at least one visual content item, an accompanying, additional visual content item, wherein an additional visual content item includes further details about a respective visual content item, and receive at least one trigger condition for each of the at least one visual content item from an upload device, wherein the at least one trigger condition includes receipt of a signal from a trigger device, wherein the trigger device and the upload device are different devices;

a database configured to store the received at least one visual content item and corresponding at least one trigger condition;

a processing device configured to determine that at least one display condition of a plurality of display conditions satisfies the at least one trigger condition, wherein the at least one display condition includes receipt of a trigger signal from the trigger device, and identify, in the database, a specific visual content item, in response to the determination that the at least one trigger condition corresponding to the specific visual content item is met based on the at least one display condition; and a display device configured to display the identified specific visual content item which includes at least a machine-readable code encoded with at least a content identifier; and wherein the receiving device is further configured to:

receive, from a requesting device, a request for additional content, wherein said request includes the content identifier, wherein a specific additional visual content item is associated, in the database, with the content identifier, and wherein the request for additional content includes the content identifier.

9. The system of claim 8, further comprising:

a transmitting device, wherein the processing device is further configured to identify the specific visual additional content item accompanying the identified specific visual content item, and the transmitting device is configured to transmit the identified specific additional content item.

10. The system of claim 8, wherein the receiving device is further configured to receive an additional content item associated with the displayed specific visual content item, and the display device is further configured to display, concurrently with the specific visual content item, the received additional content item, wherein the additional visual content item is displayed in an overlaid manner with respect to the specific visual content item.

11. The system of claim 8, further comprising:

a video capture device configured to capture a video, wherein the video includes captured images including the display of the specific visual content item by the display device; and a transmitting device configured to transmit the captured video.

12. The system of claim 8, wherein receiving the at least one visual content item further includes receiving, for each of the at least one visual content item, a bid value, and identifying the specific visual content item further includes identifying a set of visual content items, wherein the at least one trigger condition corresponding to each visual content item in the set of visual content items is met based on the identified at least one display condition, and identifying, in the set of visual content items, the specific visual content item based on the bid value corresponding to each visual content item in the set of visual content items.

13. The system of claim 8, wherein the at least one trigger condition further includes one of: a time, date, temperature, season, weather condition, population density, detection of a mobile device, and reading of a machine-readable code.

14. The system of claim 8, wherein the plurality of display conditions includes at least one of: a time, date, temperature, season, weather condition, population density, receipt of a signal from a mobile device, detection of a mobile device, and reading a machine-readable code.

15. A method for the distribution of audio and visual media, comprising:

receiving, by a receiving device, at least one visual content item to be displayed, and an audio content item;

receiving, by the receiving device, for each of the at least one visual content item, an accompanying additional visual content item, wherein an additional visual content item includes further details about a respective visual content item;

receiving at least one trigger condition for each of the at least one visual content item from an upload device, wherein the at least one trigger condition includes receipt of a signal from a trigger device, wherein the trigger device and the upload device are different devices;

storing, in a database, the received at least one visual content item and corresponding audio content item and at least one trigger condition;

determining, by a processing device, that at least one display condition of a plurality of display conditions satisfies the at least one trigger condition, wherein the at least one display condition includes receipt of a trigger signal from the trigger device;

identifying, by a processing device in the database, a specific visual content item, in response to the determination that the at least one trigger condition corresponding to the specific visual content item is met based on the at least one display condition;

displaying, by a display device, the specific visual content item, which includes at least a machine-readable code encoded with at least a content identifier; and receiving, by the receiving device, from a requesting device, a request for additional content, wherein said request includes the content identifier, wherein a specific additional visual content item is associated, in the database, with the content identifier, and wherein the request for additional content includes the content identifier; and wirelessly transmitting, by a transmitting device, the audio content item corresponding to the specific visual content item for audible emission by a mobile communication device.

16. The method of claim 15, wherein the mobile communication device is configured to audibly emit the audio content item via an application program executed by a processor of the mobile communication device.

17. The method of claim 15, further comprising:

identifying, by the processing device, the specific additional content item accompanying the identified specific visual content item; and transmitting, by a transmitting device, the identified specific additional content item to the receiving device.

18. The method of claim 15, further comprising:

receiving, by the receiving device, an additional visual content item associated with the displayed specific visual content item; and displaying, concurrently with the specific visual content item, the received additional visual content item, wherein the additional visual content item is displayed in an overlaid manner with respect to the specific visual content item.

19. The method of claim 15, further comprising:

capturing, by a video capture device, a video, wherein the video includes captured images including the display of the specific visual content item by the display device; and transmitting, by a transmitting device, the captured video.

20. The method of claim 19, wherein transmitting the captured video further includes transmitting the audio content item corresponding to the specific visual content item.

21. The method of claim 15, wherein receiving the at least one visual content item further includes receiving, for each of the at least one visual content item, a bid value, and identifying the specific visual content item further includes identifying a set of visual content items, wherein the at least one trigger condition corresponding to each visual content item in the set of visual content items is met based on the identified at least one display condition, and identifying, in the set of visual content items, the specific visual content item based on the bid value corresponding to each visual content item in the set of visual content items.

22. The method of claim 15, wherein the at least one trigger condition further includes one of: a time, date, temperature, season, weather condition, population density, detection of a mobile device, and reading of a machine-readable code.

23. The method of claim 15, wherein the plurality of display conditions includes at least one of: a time, date, temperature, season, weather condition, population density, receipt of a signal from a mobile device, detection of a mobile device, and reading a machine-readable code.

24. The method of claim 15, wherein the audio content item is audibly emitted by the mobile communication device in synchronization with the display of the specific visual content item without latency.

25. A system for the distribution of audio and visual media, comprising:

a receiving device configured to:

receive at least one visual content item to be displayed, and an audio content item, receive, for each of the at least one visual content item, an accompanying, additional visual content item, wherein an additional visual content item includes further details about a respective visual content item, receive at least one trigger condition for each of the at least one visual content item from an upload device, wherein the at least one trigger condition includes receipt of a signal from the upload device;

a database configured to store the received at least one visual content item and corresponding audio content item and at least one trigger condition;

a processing device configured to determine that at least one display condition of a plurality of display conditions satisfies the at least one trigger condition, wherein the at least one display condition includes receipt of a trigger signal from a trigger device, wherein the trigger device and the upload device are different devices, and identify, in the database, a specific visual content item, wherein the at least one trigger condition corresponding to the specific visual content item is met based on the at least one display condition;

a display device configured to display the specific visual content item, which includes at least a machine-readable code encoded with at least a content identifier; and wherein the receiving device is further configured to:

receive, from a requesting device, a request for additional content, wherein said request includes the content identifier, wherein a specific additional visual content item is associated, in the database, with the content identifier, and wherein the request for additional content includes the content identifier; and a transmitting device configured to wirelessly transmit the audio content item corresponding to the specific visual content item for audible emission by a mobile communication device.

26. The system of claim 25, wherein the mobile communication device is configured to audibly emit the audio content item via an application program executed by a processor of the mobile communication device.

27. The system of claim 25, further comprising:

a transmitting device, wherein the processing device is further configured to identify a specific additional content item accompanying the identified specific visual content item, and the transmitting device is configured to transmit the identified specific additional content item.

28. The system of claim 25, wherein the receiving device is further configured to receive an additional visual content item associated with the displayed specific visual content item, and the display device is further configured to display, concurrently with the specific visual content item, the received additional visual content item, wherein the additional visual content item is displayed in an overlaid manner with respect to the specific visual content item.

29. The system of claim 25, further comprising:

a video capture device configured to capture a video, wherein the video includes captured images including the display of the specific visual content item by the display device; and a transmitting device configured to transmit the captured video.

30. The system of claim 25, wherein receiving the at least one visual content item further includes receiving, for each of the at least one visual content item, a bid value, and identifying the specific visual content item further includes identifying a set of visual content items, wherein the at least one trigger condition corresponding to each visual content item in the set of visual content items is met based on the identified at least one display condition, and identifying, in the set of visual content items, the specific visual content item based on the bid value corresponding to each visual content item in the set of visual content items.

31. The system of claim 25, wherein the at least one trigger condition further includes one of: a time, date, temperature, season, weather condition, population density, detection of a mobile device, and reading of a machine-readable code.

32. The system of claim 25, wherein the plurality of display conditions includes at least one of: a time, date, temperature, season, weather condition, population density, receipt of a signal from a mobile device, detection of a mobile device, and reading a machine-readable code.

33. The method of claim 25, wherein the audio content item is audibly emitted by the mobile communication device in synchronization with the display of the specific visual content item without latency.

* * * * *